United States Patent [19]

Schoettle et al.

[11] 4,098,446
[45] Jul. 4, 1978

[54] PROCESS FOR THE MANUFACTURE OF TAPE GUIDES OF LARGE AREA FOR TAPE TRANSPORT APPARATUS, AND TAPE GUIDES OBTAINED BY THE SAID PROCESS

[75] Inventors: Klaus Schoettle, Heidelberg; Heinrich Wittkamp, Mannheim; Lothar Gliniorz, Frankenthal, all of Fed. Rep. of Germany

[73] Assignee: BASF Aktiengesellschaft, Ludwigshafen, Fed. Rep. of Germany

[21] Appl. No.: 711,817

[22] Filed: Aug. 5, 1976

[30] Foreign Application Priority Data

Aug. 7, 1975 [DE] Fed. Rep. of Germany ....... 2535276

[51] Int. Cl.² ............................................. G03B 1/04
[52] U.S. Cl. .................................... 226/196; 242/192; 308/3 R
[58] Field of Search ................... 308/3 R; 242/192; 226/196

[56] References Cited

U.S. PATENT DOCUMENTS 3,249,277  5/1966  Boag ................................... 226/196
3,921,933  11/1975  Rotter et al. ...................... 242/192

Primary Examiner—Joseph F. Peters, Jr.
Assistant Examiner—Gene A. Church
Attorney, Agent, or Firm—Keil, Thompson & Shurtleff

[57] ABSTRACT

The invention relates to a process for the manufacture of a tape guide of large surface area for tape transport apparatus and to the tape guide manufactured thereby. In manufacturing the guide, a strip of material is elastically deformed, after which the deformation is maintained. One of the sides of the strip of material serves as guide surface for the magnetic tape. The strip can be located on the periphery of one or more bodies, if appropriate in a groove provided therein, and can be attached to the said bodies by suitable means, for example with the aid of integral hooks provided at the ends of the strip.

The guide may be used for all types of tape transport apparatus. Since the guide of the invention offers extremely accurate tape guidance, it can be used particularly advantageously for magnetic tapes having a plurality of tracks and transported at a high speed, such as is usual, e.g., in video recording or in the recording of digital data.

11 Claims, 9 Drawing Figures

PROCESS FOR THE MANUFACTURE OF TAPE GUIDES OF LARGE AREA FOR TAPE TRANSPORT APPARATUS, AND TAPE GUIDES OBTAINED BY THE SAID PROCESS

The present invention relates to a process for the manufacture of a tape guide of large surface area for tape transport apparatus for use in conjunction with a magnetic tape having a plurality of recording tracks, in particular a video tape, and to the tape guide manufactured by the process.

A video tape guide of large surface area for use in conjunction with a film of air, the guide being provided with a concave guide surface, has already been disclosed (see, eg., U.S. Pat. No. 3,921,933). The process of manufacture comprises turning or milling one or two arc-shaped elements from a solid cylinder. After providing a number of bores for fixing, and for the air supply, the arc-shaped element or elements are ground to a somewhat greater height than the width of the video tape which is to be guided. The narrow side of the element, intended to act as the guide surface, is then provided with a concave surface by milling with a large-radius milling tool. The guide surface is then provided with flanges for guidance of the tape in the vertical direction, the flanges being fastened to the top and bottom of the arc-shaped element.

The tape guide produced as described above is of complicated design and is therefore expensive to manufacture. Stainless steel is required as the material of construction and because of the necessary close limits on tolerance machining of the stainless steel parts is extremely expensive. Consequently, this conventional tape guide is a very expensive part which effectively rules out its use in an inexpensive video recorder for amateur use.

It is an object of the present invention to provide a process for the manufacture of a tape guide which is suitable for guiding magnetic tapes transported at high speeds, especially video tapes, and can be manufactured at low cost so that its use in amateur video equipment is feasible.

We have found that this object is achieved by a process wherein at least one strip of thin resilient material is deformed below its elastic limit — in the case of metals, deformed in Hooke's range — and the deformation is maintained in such a way that the outer surface of the stretched strip can be used as the tape guide surface.

The advantage of using such resilient strips which are commercially available is that there is no need to manufacture the guide surface by machining it from a solid piece of material. The outer shape of the guide can be produced very easily by using resilient strips in accordance with the invention.

In practice, this can be achieved according to the invention by deforming the strip by attaching it to at least one backing member. The backing member can thus have the rough shape of the desired guide surface, and the desired guide surface can subsequently be accurately produced by appropriately attaching the strip to the said member.

In a further advantageous embodiment of the invention, the strip is deformed by flexural forces and by exerting superposed tensile forces in the direction in which the strip has been rolled.

It is thus possible to produce very long, dimensionally stable guide surfaces of any desired shape.

In particular, the invention makes it possible to produce concave guide surfaces of the proposed type by exerting bending forces, in the elastic range, on the strip of material so that, as a result of transverse contraction of the outer face of the strip and transverse expansion of the inner face in the region of the compressive stress below the neutral surface, a concave guide surface is formed, the concave shape of which can be maintained by hooking the ends of the strip onto at least one backing member.

Such a tape guide, which can be manufactured in a few steps, can be produced from commercial spring strip material without additional machining. The guide surface according to the invention has a precise concave shape which is necessary, eg., if the guide is used in conjunction with a cushion of air.

In a further embodiment of the invention, at least one backing member is provided, to which a strip of resilient metal, which is deformed by bending forces and by superposed tensile forces in Hooke's range, is attached. This makes it possible to produce a tape guide with a surface having any desired degree of doming, provided that a strip of sufficiently thin material is used and the surface of the backing member is appropriately shaped, so that the strip, in its tensioned position, can conform thereto in the desired manner.

In a further advantageous embodiment of the invention, the backing member is provided with at least one groove on its periphery, in which the strip can be fixedly located.

According to the invention, it is advantageous to design the edges of at least one groove as flanges for guidance of the magnetic tape in the vertical direction. It is also advantageous to provide the groove with a flat bottom and to fix the strip in the groove in such a way that it is in contact with the bottom of the groove.

Further, it has proved advantageous to give the backing member the shape of an arc and to fix the strip, bent around the curved edge of the backing member, in such a way that the deformed strip acquires a concave surface, with a predetermined degree of doming, which acts as the guide surface.

In a tape guide of this design, the doming in the various planes is effected in a single operation, namely by bending the strip. The strip according to the invention advantageously consists of a resilient material, preferably stainless spring steel.

The strip can further be provided with bent-over end portions and the backing member can be provided with appropriately shaped edges over which the said end portions can be hooked.

The abovementioned embodiments of the invention can be used with particular advantage together with a tape transport apparatus for use in conjunction with a magnetic tape having a plurality of recording tracks.

Further details of the process and of the tape guide are disclosed in the following description of the embodiments illustrated in the accompanying drawings, in which FIG. 1 is a plan view of a tape transport apparatus with a central capstan and a prior art tape guide;

Figure 1:
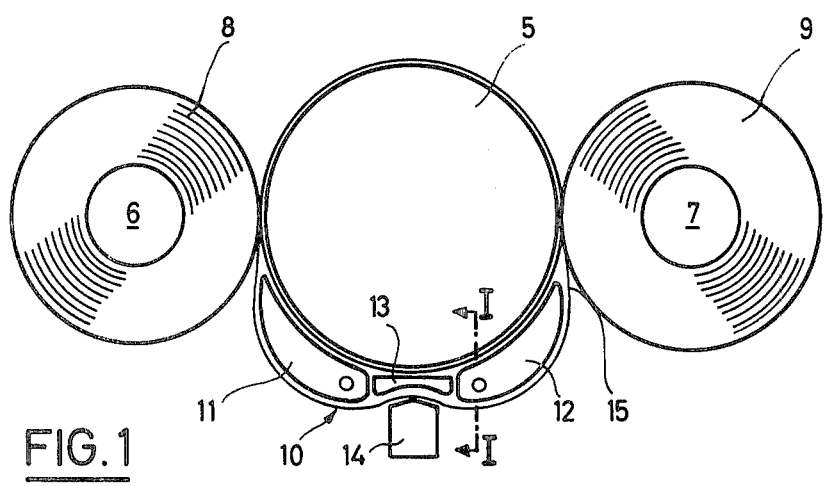

FIG. 1 shows a transport apparatus with a central capstan 5, hubs 6 and 7, tape reels 8 and 9, a three-part tape guide 10, of which the side parts are marked 11 and 12 and the middle part is marked 13, and a magnetic head 14. The magnetic head 14 is located opposite the middle part 13, which is provided with a recess where the tape is not guided. The tape 15 can, in the case of such a transport apparatus, be provided with a plurality of parallel tracks and the magnetic head can be moved at right angles to the plane of the Figure to register with each of the tracks. However, this requires that the tape be guided very precisely, which must be ensured by the design of the tape guide.

Figure 2:
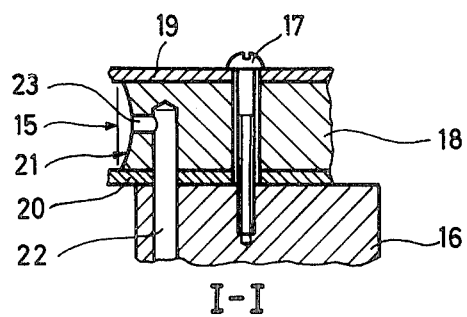
FIG. 2 is a cross-section through the tape guide of FIG. 1, taken along line I—I.

FIG. 2 shows the tape guide of FIG. 1 in cross-section along I—I. FIGS. 1 and 2 show the prior art tape guide design. The backing member 18 is fixed to the chassis 16 by means of screws 17 and is provided on the top and bottom with stainless steel plates 19 and 20. The plates 19 and 20 project beyond the tape guide surface 21 proper, which in FIG. 2 is of concave shape, and thus form flanges for guidance of the tape in the vertical direction. A cushion of air can be produced between the guide surface 21 and the tape 15 by introducing air through the channels 22 and 23, so that the tape can, as is necessary, eg., for the recording and playback of video signals, be transported past the stationary magnetic head 14 at high speed.

As explained at the outset, the tape guide shown in FIGS. 1 and 2 is reliable in operation, but it is very expensive to manufacture and costly to replace if damaged.

Figure 3:
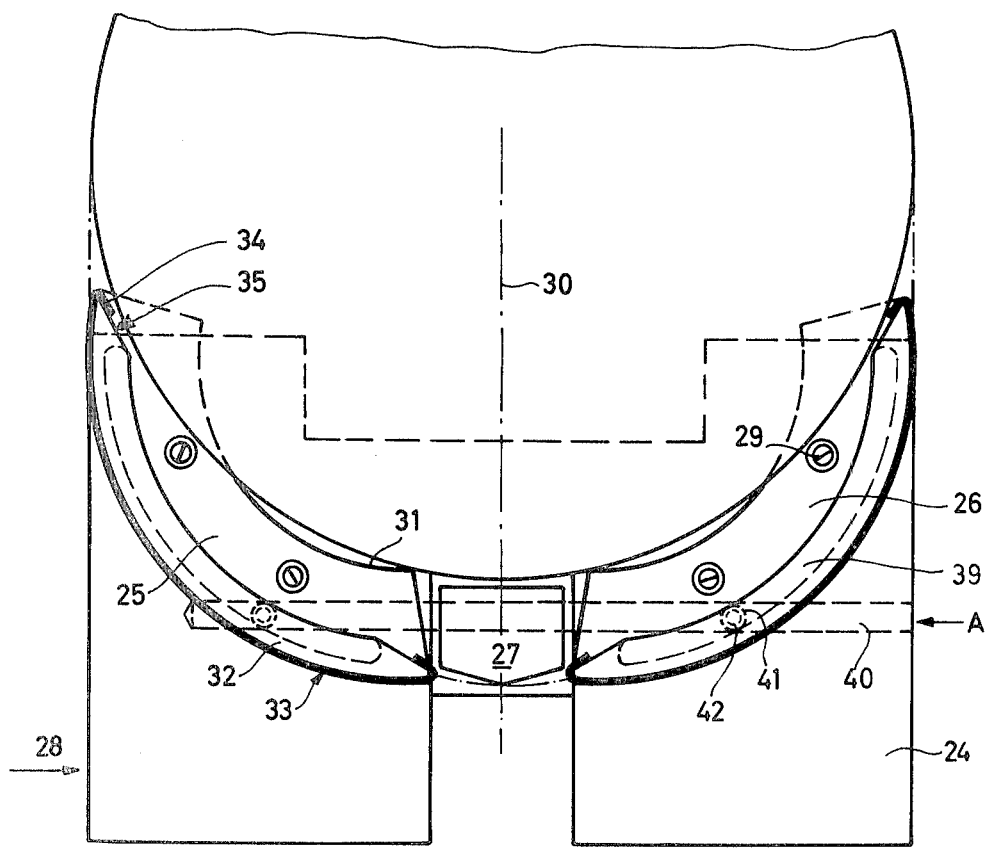
FIG. 3 shows a tape guide according to the invention, with part of the capstan of a transport apparatus according to FIG. 1.

FIG. 3 shows the construction of a first tape guide 28 according to the present invention. Here, 24 is the base and 25 and 26 are the side parts. A middle part is not required since the head 27 is located between the side parts 25 and 26 and may be moved, as desired, at right angles to the plane of the Figure, either relative to the tape guide 28 or together with the latter. The side parts 25 and 26 are suitably fixed to the base 24, eg. by means of screws 29. Since the tape guide 28 is symmetrical relative to the center line 30, only the side part 25 will be described below, it being shows in cross-section in FIG. 4.

Figure 4:
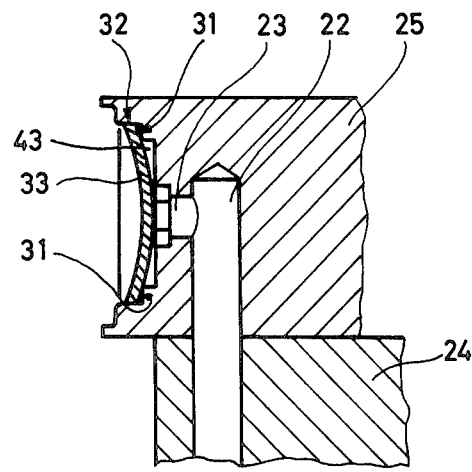
FIG. 4 is an enlarged cross-sectional view of a tape guide according to FIG. 3.
Figure 5:
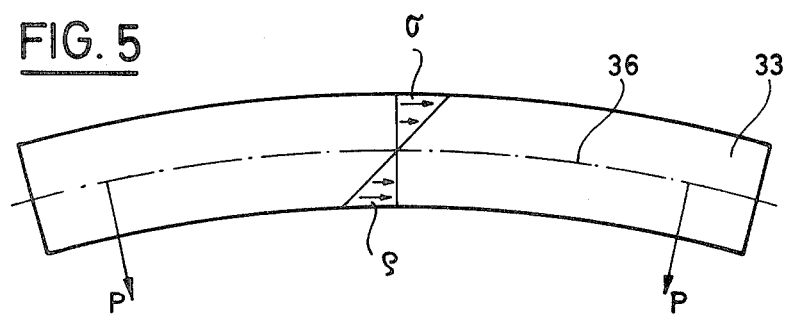
FIG. 5 is a plan view of the tape guide according to FIG. 3, with a diagrammatic representation of the stresses.
Figure 6:
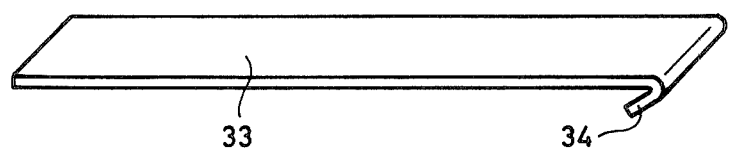
FIG. 6 shows part of a tape guide according to FIG. 3 in the relaxed state.

The air feed channels essentially correspond to the channels 22 and 23 in FIG. 2 and are also marked with the same numbers. In contrast to the tape guide of FIG. 2, the front end of the channel 23 can be machined simultaneously with the groove. The rear end of the channel 23 communicates with the channel 22. The outlet orifice can be brought to the required diameter by fitting an O-ring. It is possible to provide a plurality of individual channels 22, and channels 23 communicating therewith. A further advantageous air feed arrangement will be described later. The groove which is cut out by the machine tool is advantageously provided with shoulders 31 and a rim 32. The resilient strip 33 which bears against these shoulders 31 and may or may not be in contact with the rim 32 forms the guide surface for the tape 15. FIG. 6 shows such a strip 33 in the relaxed state. After the bent-over end portion 34 has been hooked over one of the chamfered ends 35 the side part 25, the strip can be bent over the outer curved side of part 25 and the other end portion can be hooked, with appropriate play, over the other chamfered end, whilst maintaining the deformation. The length of the strip 33 is advantageously slightly shorter than the distance between the chamfered ends 35 of the side part 25. In any case, the deformation must be below the elastic limit of the particular material used. It has proved advantageous to exert about 80% of the work of deformation required to reach the elastic limit, which ensures that the material remains in the elastically deformable range and that the tension in the strip is therefore maintained and plastic deformation does not occur. The depth of the concave doming of the strip which is produced, and which is also shown in FIG. 4, can be varied within narrow limits by varying the tensile forces. The depth depends on the type of air film used, the tape speed, the stiffness of the tape and the like. FIG. 5 shows diagrammatically the stresses which occur in the deformed strip 33, which is shown turned through 90° relative to FIG. 4, that is to say in the horizontal position. The line 36 symbolizes the neutral surface of the strip 33 which is concavely domed after deformation. This is due to the fact that, on bending, tensile stresses $\sigma$ are produced above the neutral surface and compressive stresses $\rho$ below the said neutral surface which cause a transverse contraction and a transverse expansion respectively. The result of these two effects is that the bent strip becomes concavely domed in the plane at right angles to the bending plane. The forces are indicated by arrows P.

The strips can be mass-produced simply and cheaply from spring steel, eg. from stainless steel. However, the strips can also be produced from a suitable plastics material. Advantageously, the strips have a thickness of the order of 0.4 mm. A further advantage is that the strips can be easily provided with a predetermined uniform surface roughness, for example by sandblasting. The surfaces of the metal strips, which may be produced, eg., by drawing, are free from scratches, in contrast to guide surfaces which have been machined by milling. These scratches are due to small nicks in the milling tool and/or other faults in the tool arising from wear.

It is necessary that the surface structure of the guide surface should be extremely uniform and, in particular, that the guide surface should be uniformly slightly rough so that, if the tape guide is used in conjunction with a cushion of air, optimal tape flight is achieved. The concave doming produced by bending the above strip is more accurate, by an order of magnitude, than that produced by milling. As is clear from what has been said above, the use of a guide of the invention in conjunction with a cushion of air for tape guidance is particularly advantageous, especially if concave or convex guide surfaces are required. However, the strips can also be used advantageously for tape guides which do not use a cushion of air.

The embodiment of the tape guide of the invention described above and shown in FIG. 4 can be manufactured by conventional methods and from conventional materials. A further, particularly economical method of manufacturing the tape guide is described below.

Figure 8:
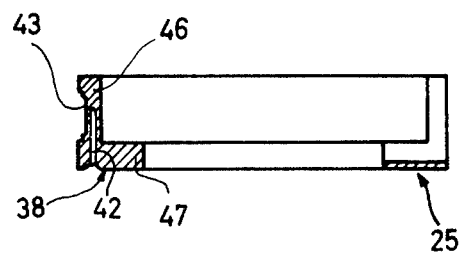
FIG. 8 is a cross-section through the blank of FIG. 7, taken along line III—III.

The side part 25 in FIG. 8 is of L-shaped cross-section, the vertical part being marked 46 and the horizontal part being marked 47. The horizontal part 47 is provided with holes for fastening screws. The parts 46 and 47 are arc-shaped, with the part 46 having the larger radius. A groove 39 which is roughly semi-circular in cross-section is machined into the underside 38 of the side part 25, which underside rests directly on the upper side of the base 24. The groove 39 is of about the same arc shape as the part 46. As shown in FIG. 3, a straight channel 40 is provided in the base 24 which communicates with a vertical bore 41, shown as a circle, to connect the groove 39 to the channel 40. A suitable seal must be provided at the abutment of the side part 25 and the base 24, so that the groove 39 can act as an air supply channel. An arrow A marks the air inlet orifice of the channel 40 in the base 24.

FIG. 8 shows a bore 42, through which the groove-like channel can be connected with air outlet orifices for the purpose of forming the cushion of air. The outer face of the part 46 can, as shown, be provided with a groove 43 having a flat bottom, which groove can be produced by turning or milling. A thin strip having a thickness of about 0.4 mm, bent to conform to the contour of the outer face of the side part 25, can be so attached that it is in contact with the flat bottom over its entire width, in which case doming of the strip is not produced. It has been found, surprisingly, that given a suitable shape of the backing member, which backing member can, in all embodiments, be manufactured with little difficulty and from inexpensive material, and if the thickness of the strip and material of construction from which it is made are suitably chosen, any desired shape of tape guide surface can be produced.

Figure 7:
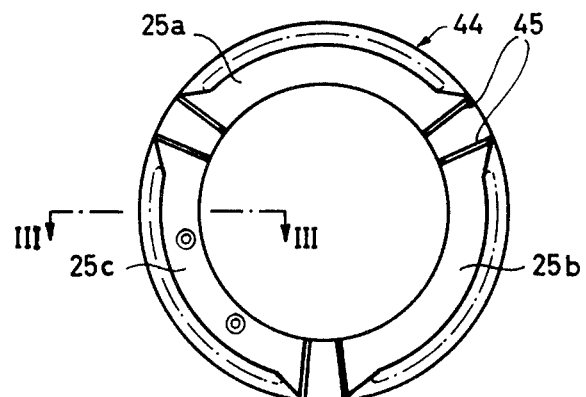
FIG. 7 shows a blank for three backing members for tape guides according to the invention.

The arc-shaped side parts, which form the backing members in the embodiments which have been described, can be manufactured particularly advantageously in groups of three. FIG. 7 shows a ring 44 with three identical side parts 25a–25c, which ring can be advantageously manufactured by casting from bronze, brass or a light metal, eg. aluminum. The side parts are completely finished and it is even possible to produce the bores therein during casting. Points of weakness 45, where breaking is intended to occur, furthermore ensure that the parts are simple to separate for further processing. The groove 39 can also be produced during casting. The groove 43 can of course be produced whilst the ring 44 is still in one piece.

Figure 9:
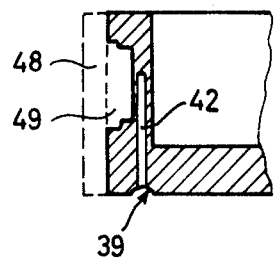
FIG. 9 shows a further enlargement of part of the blank shown in FIG. 8.

FIG. 9 shows a plate 48, in dashed lines, which, when the strip 33 has been fitted, seals off groove 43 from the outside, so that a guide channel 49 for a leader tape for use in a self-threading tape transport apparatus is produced. For the sake of simplicity, the strip 33 is not shown in this Figure.

We claim:

1. A tape guide for tape transport apparatus, said guide comprising at least two distinct parts, namely at least one backing member and separately therefrom, a strip of resilient material, elastically deformed below the elastic limit of the material to provide a dimensionally stable guide surface, and attached to the backing member at longitudinally spaced points so as to maintain the deformation.

2. A tape guide as claimed in claim 1, wherein the backing member is so designed that the strip in the deformed state conforms to the shape of the backing.

3. A tape guide as claimed in claim 1, wherein the backing member is arc-shaped and the strip is bent over the backing member and is fixed thereto in such a way that the strip has a concave surface of predetermined depth which acts as guide surface.

4. A tape guide as claimed in claim 1, wherein the strip is of spring steel.

5. A tape guide as claimed in claim 1, wherein the strip is of a plastics material.

6. A tape guide as claimed in claim 1, wherein the strip has hook-shaped bent-over end portions and the backing member is so designed that the strip can be fixed thereto by means of the said end portions.

7. A tape guide as claimed in claim 1, wherein two backing members are employed, each in the form of about one-third of a ring-shaped body manufactured by casting and possessing points of weakness where it is intended that breaking should occur.

8. A tape guide for magnetic tape transport apparatus, as claimed in claim 1, wherein a groove, in which the strip is located, is provided on the periphery of the backing member.

9. A tape guide as claimed in claim 8, wherein the width of the groove is so chosen that its rims form edges for guiding the magnetic tape in the vertical direction, the tape being transported along the groove and over the surface of the strip.

10. A tape guide as claimed in claim 8, wherein the groove has a flat bottom and the strip is fixed to the backing member so as to be in contact with the bottom of the groove.

11. A tape guide as claimed in claim 10, wherein the outer surface of the strip is of concave shape and the convex surface of the strip is in contact with the bottom of the groove.

* * * * *